(12) United States Patent
Helmeczi et al.

(10) Patent No.: US 7,581,691 B2
(45) Date of Patent: Sep. 1, 2009

(54) FLAIL ROTOR FOR A BALE PROCESSOR

(75) Inventors: Raymond Helmeczi, Saskatchewan (CA); Dan McCarthy, Saskatchewan (CA)

(73) Assignee: Bridgeview Mfg. Inc., Gerald, Saskatchewan (CA)

( * ) Notice: Subject to any disclaimer, the term of this patent is extended or adjusted under 35 U.S.C. 154(b) by 194 days.

(21) Appl. No.: 10/874,728

(22) Filed: Jun. 23, 2004

(65) Prior Publication Data

US 2005/0017108 A1 Jan. 27, 2005

Related U.S. Application Data

(60) Provisional application No. 60/489,118, filed on Jul. 23, 2003.

(51) Int. Cl.
*B02C 13/09* (2006.01)

(52) U.S. Cl. ............... 241/189.1; 241/194; 241/605

(58) Field of Classification Search ... 241/186.2–186.4, 241/189.1, 194, 605, 101.76, 101.77
See application file for complete search history.

(56) References Cited

U.S. PATENT DOCUMENTS

| | | | | |
|---|---|---|---|---|
| 1,871,489 | A | * | 8/1932 | Ammon .................... 241/189.1 |
| 2,557,865 | A | * | 6/1951 | Emmanouilidis ............. 241/74 |
| 3,333,777 | A | * | 8/1967 | Highfill, Jr. et al. ........... 241/47 |
| 3,918,649 | A | * | 11/1975 | Miller ..................... 241/189.1 |

(Continued)

OTHER PUBLICATIONS

Canadian Intellectual Property Office; Office Action; Apr. 8, 2008.
Gowling Lafleur Henderson LLP; Response to Canadian Official Action; May 27, 2008.

(Continued)

*Primary Examiner*—Bena Miller
(74) *Attorney, Agent, or Firm*—Dinsmore & Shohl LLP

(57) ABSTRACT

The novel rotor for a bale processor comprises a number of plate sections that extend radially outward from a rotor axis with bale disintegrators mounted on outer edges of the rotor plate sections for bale disintegration during rotor rotation. The rotor may have four or at least four rotor plate sections. One such rotor includes a first rotor plate having a predetermined width W, length L and thickness T, second and third rotor plates each having a thickness T, a length L and a width approximately equal to $(W/2-\frac{1}{2}T)$. The second rotor plate is fixed to one side of the first rotor plate and the third rotor plate is fixed to the other side of the first rotor plate to form a symmetrical rotor having a length L and an X-cross-section. The disintegrators include a number of pairs of flail supports fixed to outer edges of the rotor plates and a flail pivotally mounted to each of the flail support pairs. The flail supports may be unidirectional and include a first leg for welding to the outer edge of the rotor plate and a second leg for welding to a side of the rotor plate. The flail supports may alternately be bi-directional and include a pair of spaced legs for positioning the support over the outer edge of the rotor plate section for welding to the sides of the rotor plate section. In addition, the flails may be unidirectional or bi-directional. In one embodiment, the flails are shorter than the distance between the outer edges of adjacent rotor plate sections, and the plate sections include relief holes for receiving the ends of the flails.

20 Claims, 18 Drawing Sheets

U.S. PATENT DOCUMENTS

| | | | | |
|---|---|---|---|---|
| 4,497,448 A | * | 2/1985 | Joa et al. | 241/186.4 |
| 4,830,292 A | | 5/1989 | Frey | |
| 5,505,390 A | * | 4/1996 | Rodgers | 241/48 |
| 6,109,553 A | | 8/2000 | Hruska | |

OTHER PUBLICATIONS

Canadian Intellectual Property Office; Canadian Notice of Allowance; Oct. 10, 2008.

Allowed Canadian Claims.

* cited by examiner

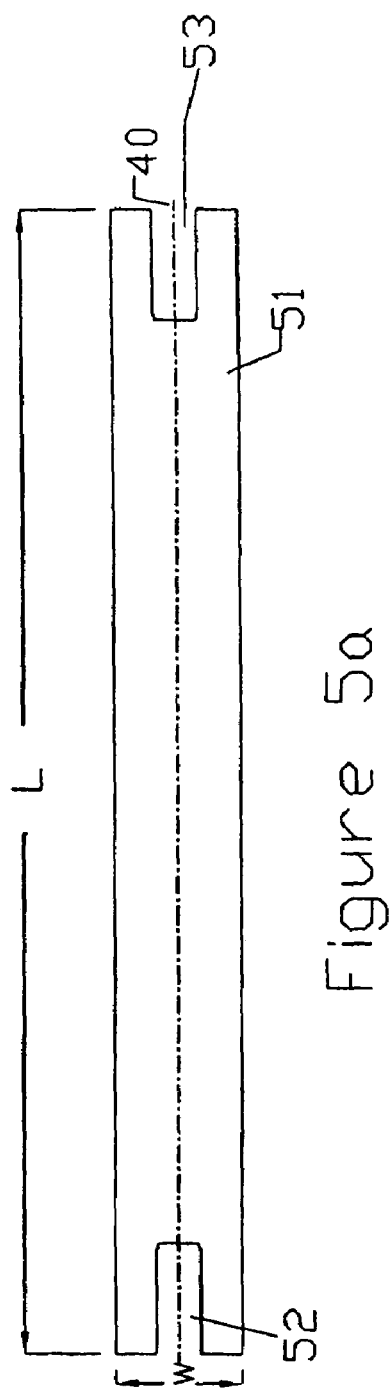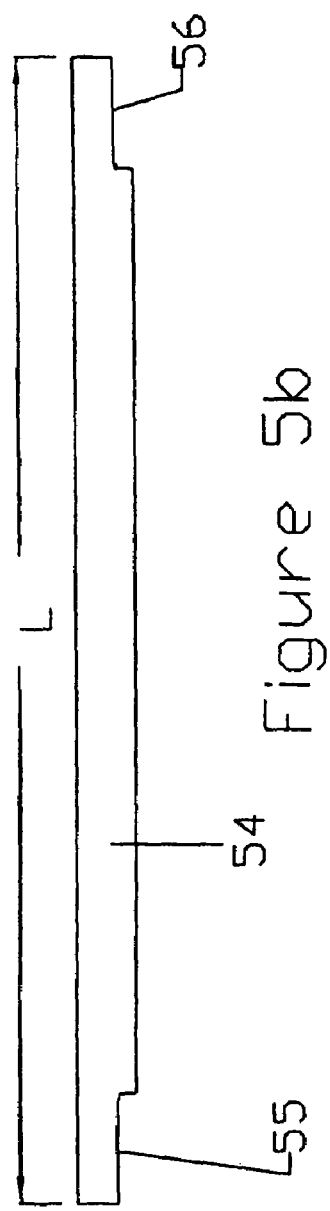

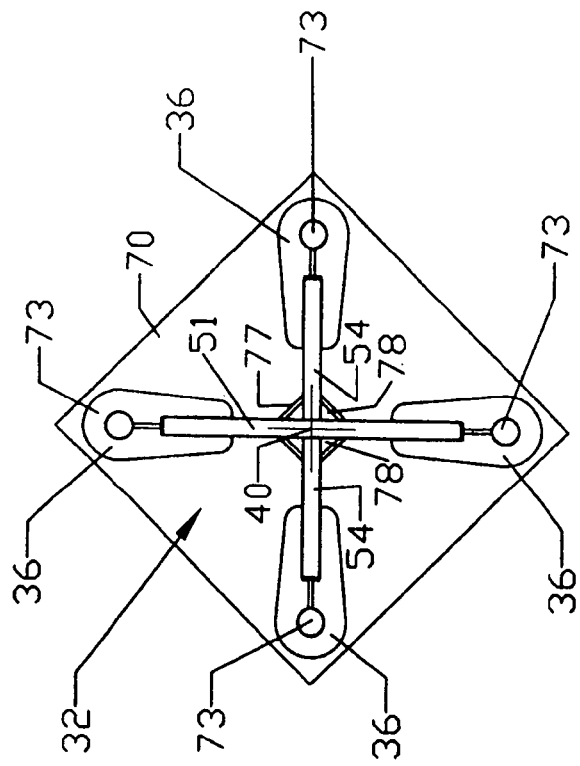
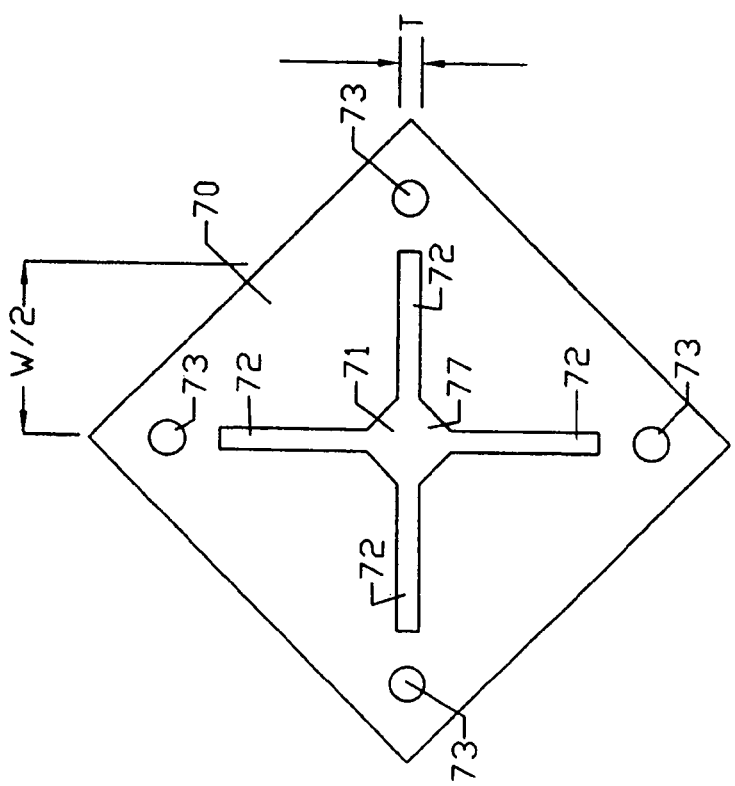

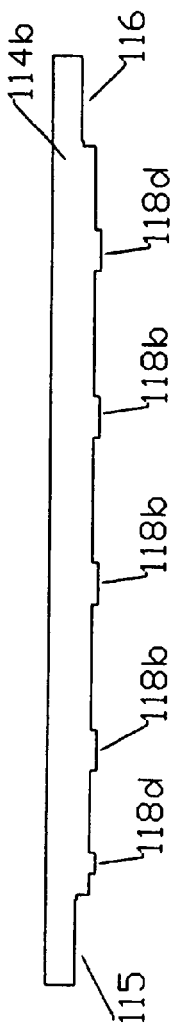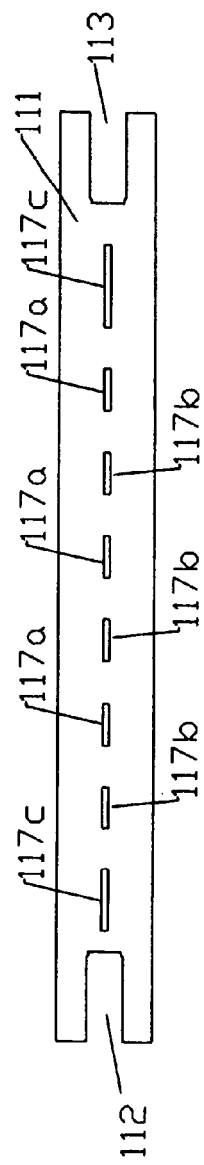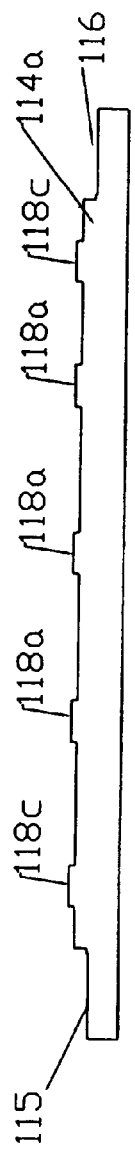
Figure 11c
Figure 11a
Figure 11b

FLAIL ROTOR FOR A BALE PROCESSOR

This application claims the benefit of U.S. Provisional Patent Application Ser. No. 60/489,118 filed on Jul. 23, 2003.

FIELD OF INVENTION

The invention relates generally to bale processors, and more particularly to the flail rotors for bale processors.

BACKGROUND OF THE INVENTION

Crop materials, such as straw, hay or any other similar forage or animal bedding, are often baled for storage and transportation. In many instances, it is necessary to break the bale apart as well as chop or shred the crop material in order to spread it for animal bedding or to dispense it as feed.

A machine to disintegrate bales of crop material is sometimes known as a baled crop material processor. A typical machine is described in U.S. Pat. No. 4,830,292, which issued to Frey on May 16, 1989. A baled crop material processor basically comprises a container for receiving the bales, a disintegrator often in the form of a rotor with cutters or flails for chopping or shredding the material from the bale, a mechanism including manipulator rollers and/or a belt to direct the bale to the disintegrator and a discharge slot such that the crop material is discharged from the bale processor. The baled crop material is supported and rotated by the manipulator rollers and/or a belt. As the crop material bale rotates, the disintegrator breaks apart the outer portion of the baled crop material first and then proceeds to break apart the crop material towards the centre of the bale until the crop material is completely broken apart. As the baled crop material is disintegrated, the loose crop material is driven by the flails to be discharged from the machine through the discharge slot.

An example of such a typical flail disintegrator for a bale processor is illustrated in cross-section in FIG. 1 and is also described in U.S. Pat. No. 6,109,553 issued on Aug. 29, 2000 to Hruska, which is incorporated herein by reference. The flail disintegrator 10 includes a cylindrical shaped rotor 12 having a substantially circular cross-section. A number of flails 13 are pivotally mounted on the flail rotor 12. The flails 13 are intermittently spaced along the length and symmetrically spaced around the circumference of the rotor 12 for balance. Each flail 13 is made from a solid metal bar having a rectangular cross-section and, in this example, is reverse bent at two points. One end of each flail 13 is welded to a hollow cylindrical section 14 for pivotally mounting by a bolt 15 to a support or tab 6 that is welded to the rotor 12. The other end 17 of flail 13 is bevelled to provide a cutting or tearing edge. The flail disintegrator 10 may further have a twine disk 18 fixed to each end of rotor 12.

The manufacture of the flail disintegrator 10 can be difficult and expensive. One of the reasons is the type of pipe that is available. Pipe that is used for the cylindrical shaped rotor 12 is procured from steel mills and is often found to be slightly bent longitudinally, i.e. the pipe has a crown in it. Also, the pipe may be slightly out of round, has an internal seam and may have a variance in wall thickness around its circumference, which inherently put it out of balance. Further the pipe may be dented or bent during transportation due to its round shape which is more difficult to package.

Since the rotor 12 is round, it cannot be easily manipulated or squared during the manufacture process. Aligning and squaring the flail supports 16 on the round surface can be difficult and inconsistent, and any cuts done to the rotor 12 must be done with a saw, plasma cutter or a torch, which limits the modifications that could be made to enhance the performance of the disintegrator 10.

In view of the speed at which the flail rotor 12 rotates and the stresses placed upon it by the attached flails 13 as they whip through the bale being processed and as they strike back on the rotor 12, the strength of the rotor 12 is a major factor in its longevity. It has also been found that twine from bales tends to wrap itself quite tightly around the cylindrical rotor 12 making it difficult to remove with a knife or an electrical twine removal device.

Therefore, there is a need for an improved flail rotor for a bale processor.

SUMMARY OF THE INVENTION

The present invention is directed to a rotor for a bale processor comprising a number of plate sections that extend radially outward from a rotor axis with bale disintegrators mounted on outer edges of the rotor plate sections for bale disintegration during rotor rotation.

In accordance with an aspect of the invention, a disintegrator for a bale processor comprises a rotor having a number of rotor plate sections extending radially from a rotor axis, a shaft extending out of each end of the rotor along the rotor axis whereby the rotor is adapted to be rotatably mounted in the bale processor, and bale disintegrators mounted on the rotor plate sections for bale disintegration during rotor rotation.

In accordance with another aspect of the invention, a rotor for a bale processor disintegrator comprises a number of plate sections having first and second ends and first and second edges with the plate sections extending radially from a rotor axis where the first edges of the plate sections are attached, and bale disintegrators are mounted on the second edge of the rotor plate sections for bale disintegration during rotor rotation.

In accordance with a further aspect of this invention, the rotor has four or at least four rotor plate sections In accordance with another aspect of this invention, a rotor for a bale processor disintegrator comprises a first rotor plate having a predetermined width W, length L and thickness T; second and third rotor plates each having a thickness T, a length L and a width approximately equal to (W/2−½T), the second rotor plate being fixed to one side of the first rotor plate and the third rotor plate being fixed to the other side of the first rotor plate to form a symmetrical rotor having a length L and an X-cross-section, and bale disintegrators mounted on outer edges of the rotor plates and adapted to disintegrate a bale during rotor rotation.

In accordance with a further aspect of this invention, dowel slots are spaced along the centerline of the first rotor plate and dowels corresponding to the dowel slots are located on the inner edges the second and third rotor plates.

In accordance with another aspect of this invention, a rotor for a bale processor disintegrator comprises a first and a second rotor plate having a predetermined width W length L and thickness T, and each rotor plate has a slot with a width T, and a length L/2 along the centerline from one end of the plate, so that the first and second rotor plates can be mated together along the slots to form a symmetrical rotor having a length L and an X-cross-section, and bale disintegrators mounted on outer edges of the rotor plates for disintegrating a bale during rotor rotation.

In accordance with a further aspect of this invention, the disintegrators include a number of pairs of flail supports fixed to outer edges of the rotor plates and a flail pivotally mounted to each of the flail support pairs. The flail supports may be unidirectional and include a first leg for welding to the outer edge of the rotor plate and a second leg for welding to a side of the rotor plate. The flail supports may also be bi-directional and include a pair of spaced legs for positioning the support over the outer edge of the rotor plate section for welding to the sides of the rotor plate section. In addition, the flails may be unidirectional or bi-directional.

In accordance with a further aspect of this invention, the pairs of flail supports on adjacent rotor plates are offset from one another.

In accordance with another specific aspect of this invention, the flails are longer than the distance between the outer edges of adjacent rotor plate sections.

In accordance with an alternate aspect of this invention, the flails are shorter than the distance between the outer edges of adjacent rotor plate sections, and the plate sections include relief holes for receiving the ends of the flails.

In accordance with another specific aspect of this invention the edge of the plate sections under the flails may be notched to allow the flail to swing through a greater rotation angle.

In accordance with a further aspect of this invention twine disks are mounted on the ends of the flail rotor.

These aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

These and other features of the invention will become more apparent from the following description in which reference is made to the appended drawings wherein:

FIGS. 5a and 5b illustrate one embodiment of rotor plates used in the construction of an X-rotor in accordance with the present invention;

FIGS. 7a and 7b illustrate a squaring jig for the construction of an X-rotor;

FIGS. 11a, 11b, and 11c illustrate a further embodiment of rotor plates used in the construction of an X-rotor in accordance with the present invention;

DETAILED DESCRIPTION

Figure 1:
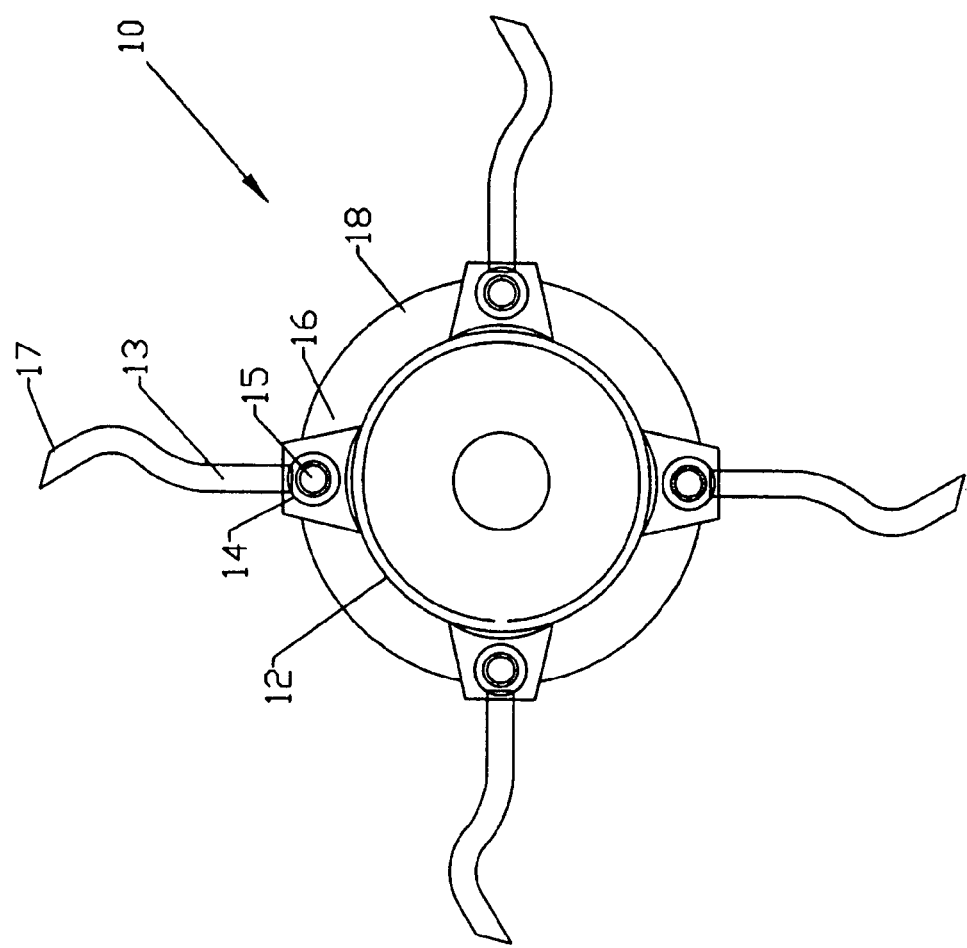
FIG. 1 illustrates in cross-section a prior art disintegrator having a cylindrical flail rotor.
Figure 2:
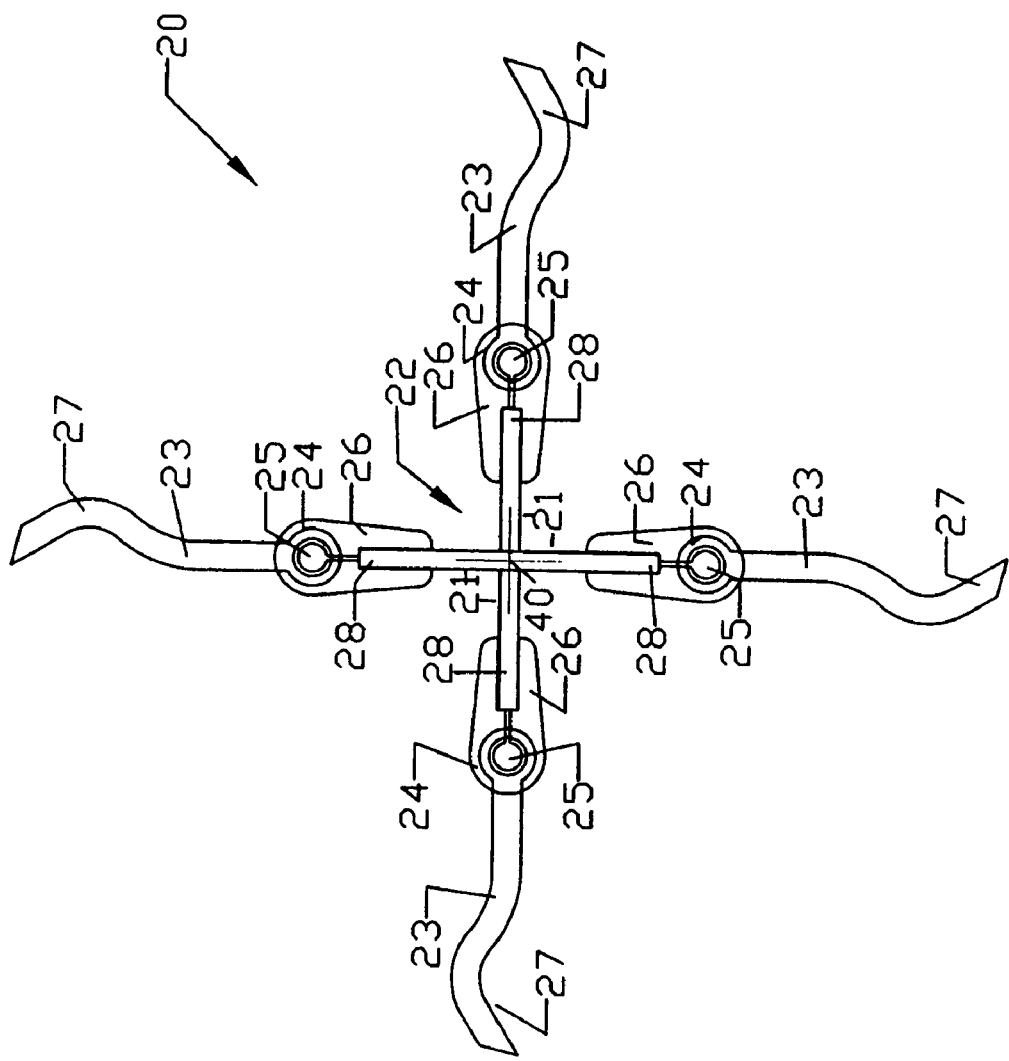
FIG. 2 illustrates in cross-section the basic concept of an X-rotor in accordance with the present invention.

A flail disintegrator 20 for a bale processor in accordance with the present invention is illustrated in cross-section in FIG. 2. The flail disintegrator 20 includes a rotor 22 made from elongated rotor plates 21 fixed together to form an X-shaped cross-section with adjacent plates 21 at 90° with respect to each other. Though the rotor 22 is shown to have four plate sections 21 extending radially from an axis 40, it is within the scope of the present invention to have any number of plate sections 21 as long as they are arranged to maintain a proper balance of the rotor 22, such as by making all of the angles between adjacent plates the same.

A number of flails 23 are pivotally mounted and intermittently spaced along the length of each of the outer edges 28 of the rotor plates 21. The flails 23 are positioned on the X-rotor 22 so as to maintain a balanced rotor 22. Each flail 23 is made from a solid metal bar having a rectangular cross-section and, in this example, is reverse bent at two points. One end of each flail 23 is welded to a hollow cylindrical section 24 for pivotally mounting by a bolt 25 to a support or tab 26 that is welded to the outer edge 28 of the plates 21. The other end 27 of flail 23, which is reverse bent, is bevelled at the very end to provide a cutting or tearing edge.

Figure 3:
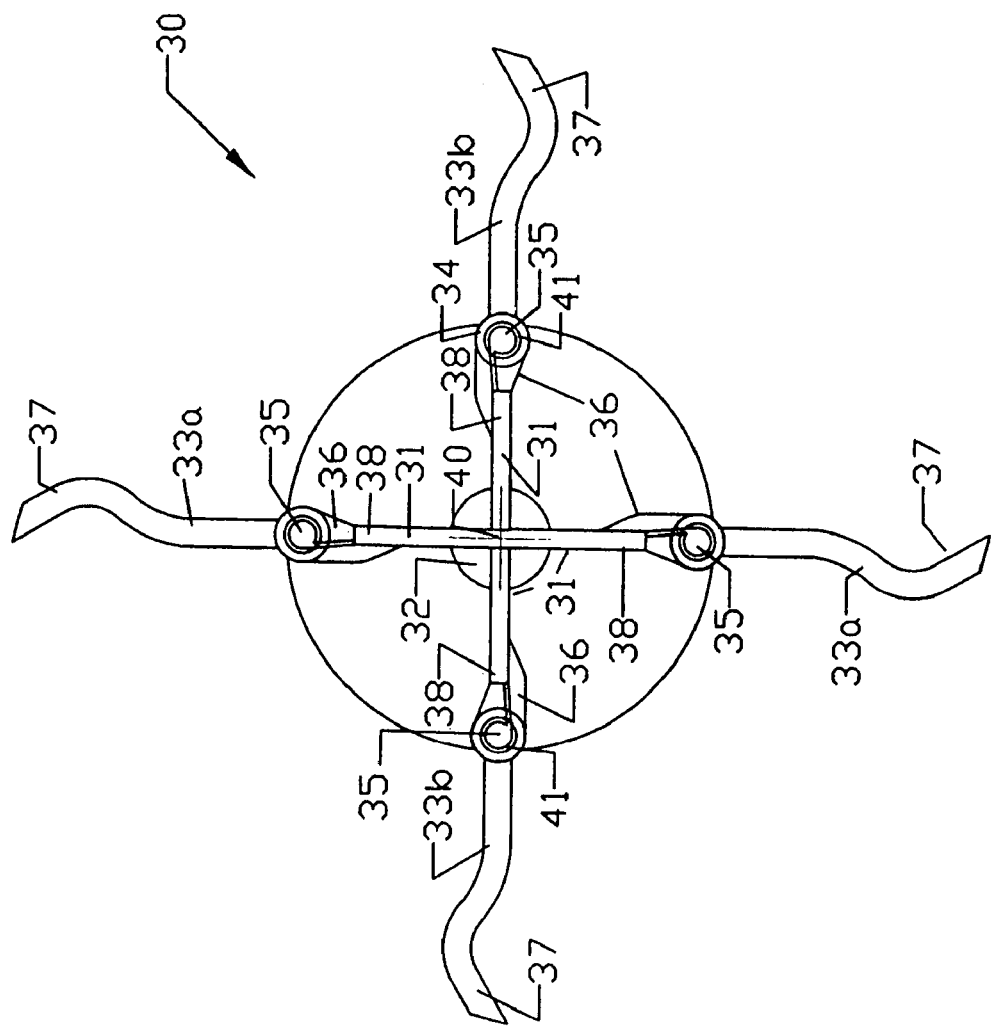
FIG. 3 is an end view of an X-rotor in accordance with the present invention.
Figure 4:
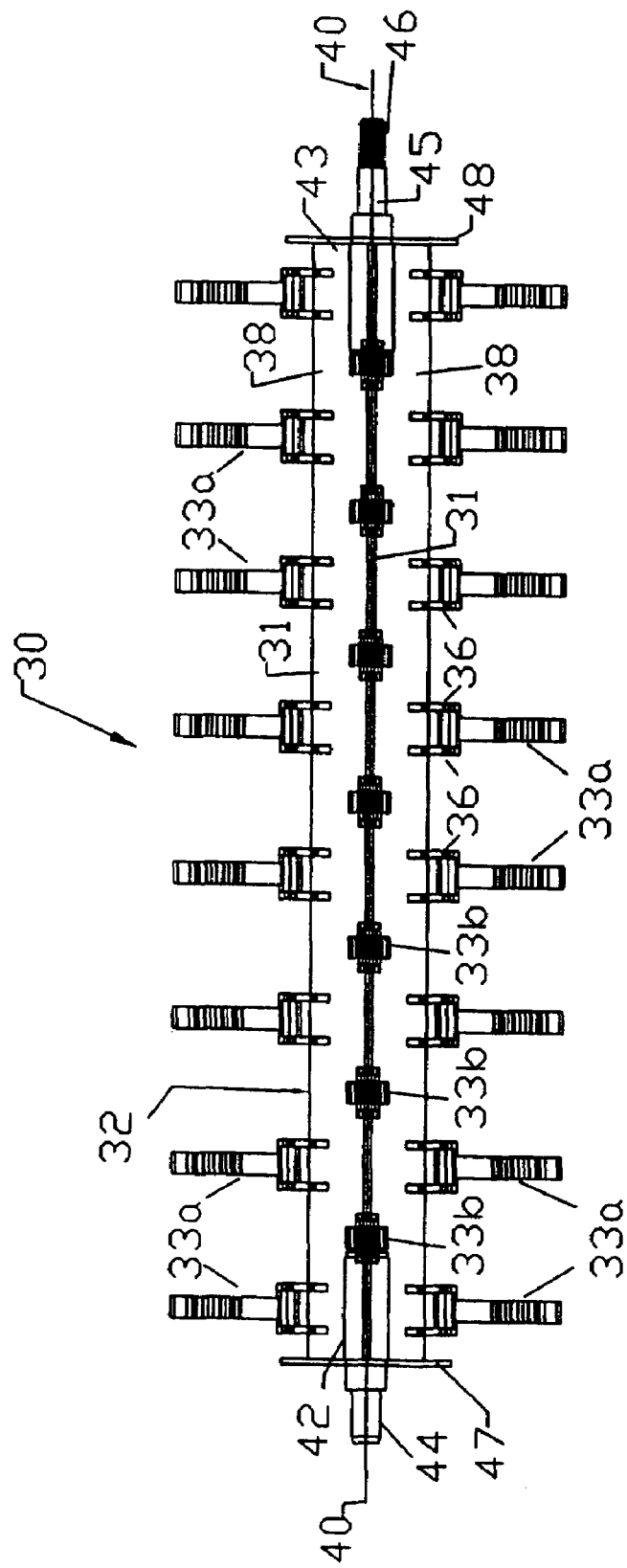
FIG. 4 is a side view of an X-rotor in accordance with the present invention.

FIGS. 3 and 4 illustrate an embodiment of the flail disintegrator 30 in accordance with the present invention. Disintegrator 30 includes an X-rotor 32 constructed from elongated rotor plates 31 fixed together to form a rotor 32 that has a substantially symmetrical X cross-section about the rotor axis 40. Various possible arrangements of rotor plate 31 components will be described with respect to FIGS. 5 to 9.

Flails 33a and 33b are mounted at the outer edges 38 of plate sections 31 by flail supports or tabs 36. As in prior devices, each flail 33a and 33b is made from a solid metal bar having a rectangular cross-section and, in this example, is reverse bent at two points. One end of each flail 33a and 33b is welded to a hollow cylindrical section 34 for pivotally mounting by a bolt 35 to a support or tab 36. For durability, a flail bushing 41 is pressed inside the hollow cylindrical section 34, such that the bolt 35 can pivot freely within the bushing 41. The supports 36 are welded to the outer edges 38 of the plate sections 31 on the X-rotor 32. The other end 37 of flails 33a and 33b is bevelled to provide a cutting or tearing edge. Various different tabs 36 may be used to mount the flails 33a and 33b to the X-rotor 32, examples of which will be described with respect to FIGS. 16 to 19.

As shown in FIG. 4, flails 33a and 33b are spaced along the edge 38 of each plate section 31. Once again, it is important to have a balanced X-rotor 32 and therefore the positioning of the flails 33a and 33b on plate sections 31, which are diametrically opposite one another, are shown to be preferably identical and symmetrical. However, in order to prevent the flails 33a and 33b from striking one another, the flails 33a and 33b on adjacent plate sections 31 are offset from one another. FIG. 4 illustrates one example wherein the flails 33a on the upper and lower plate sections 31 of the X-rotor 32 are positioned identically, as are the flails 33b on the front and back plate sections 31. However the flails 33a on the upper and lower plate sections 31 are positioned between the flails 33b on the front and back plate sections 31 along the length of the X-rotor 32.

In order to mount the flail disintegrator 30 into a bale processor, shafts 42 and 43 are fixed into the ends of the X-rotor 32. Shaft 42 is terminated as a rotor stub 44 that will slide into a bearing in the wall of the bale processor so as to rotate freely. Shaft 43 is also machined down as a rotor stub 45 so that the flail disintegrator 30 can be supported by a bearing in an opposite wall of the bale processor, however, rotor stub 45 is finished as a splined shaft 46 for connection to a rotating power source, such as the power take-off from a tractor. Also mounted over rotor shafts 42 and 43 are twine disks 47 and 48 respectively, which prevent the twine from the bales from wrapping around the rotor stubs 44 and 45 and getting into the bearings. The twin disks 47 and 48 are also preferably fixed as by welding to the ends of rotor plates 31 of the X-rotor 32.

As indicated above, within the scope of the present invention, there are many ways that the X-rotor 32 may be made. In its simplest form, the X-rotor 32 may be made up of three plates, two of which are shown in FIGS. 5a and 5b. Plate 51 is a full width rotor plate that has a length L equal to the desired length of the X-rotor 32, a width W equal to the overall width of the desired X-rotor 32 and a thickness T. Plate 51 further includes notches 52 and 53 at either end for receiving the rotor shafts 42 and 43 described in conjunction with FIG. 4. Plate 54 is a half width plate that has a length L equal to the desired length of the X-rotor 32 and width that is slightly less than W/2 in order to compensate for the thickness of the plate 51. Thus, if the thickness T of plate 51 is ½ inch, then the width of plate 54 would be (W/2−¼) inches such that when a plate 54 is placed on either side of plate 51 and perpendicular to it, the overall width of the desired X-rotor 32 will be W. Plate 54 also has notches 55, 56 at its ends for the rotor shafts 42 and 43 respectively.

In the construction of the X-rotor 32, the plates 54 would be placed along the axis 40 of plate 51 and welded in place to form a symmetrical and balanced X-rotor 32.

Figure 6:
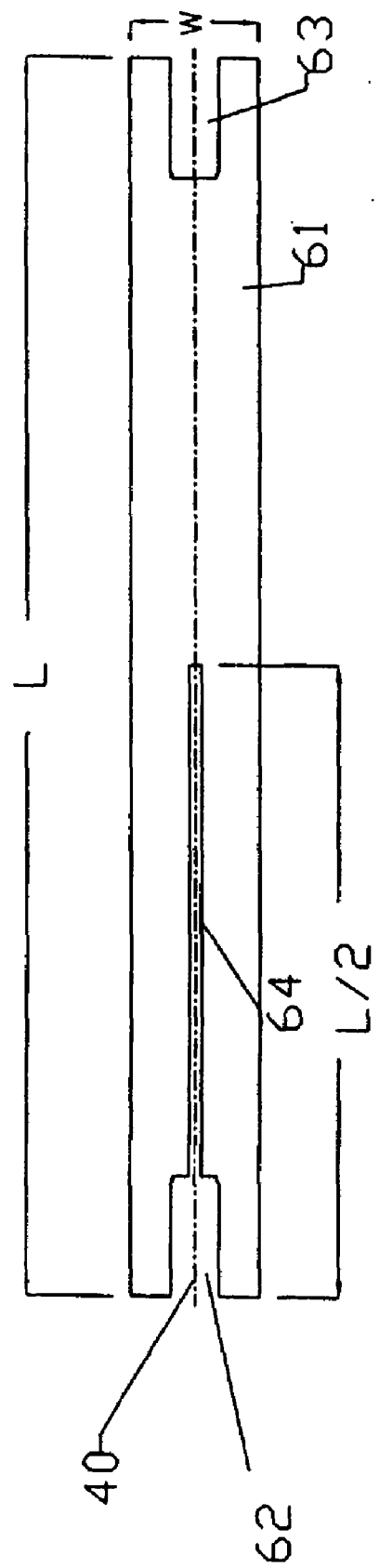
FIG. 6 illustrates another embodiment of a rotor plate used in the construction of an X-rotor in accordance with the present invention.

In a further embodiment of the present invention, the X-rotor 32 may be made up of two full width rotor plates 61 of the type shown in FIG. 6. Plate 61 has a length L equal to the desired length of the X-rotor 32 and a width W equal to the overall width of the desired X-rotor 32. Plate 61 further includes notches 62 and 63 at either end for receiving the rotor shafts 42 and 43 described in conjunction with FIG. 4. However, plate 61 further includes a slot 64 cut out of the plate 61 along the centerline axis 40. The overall length of the slot 64 from the end of the plate 61 is just slightly greater than L/2 and the width of the slot 64 is equal to the thickness T of the plate 61 such that the X-rotor 32 can be made by using two plates 61 which are mated by sliding one plate 61 into the other plate 61 along the slots 64. Once the plates 61 are mated and positioned on the centerline axis 40, they are welded together.

Figure 9:
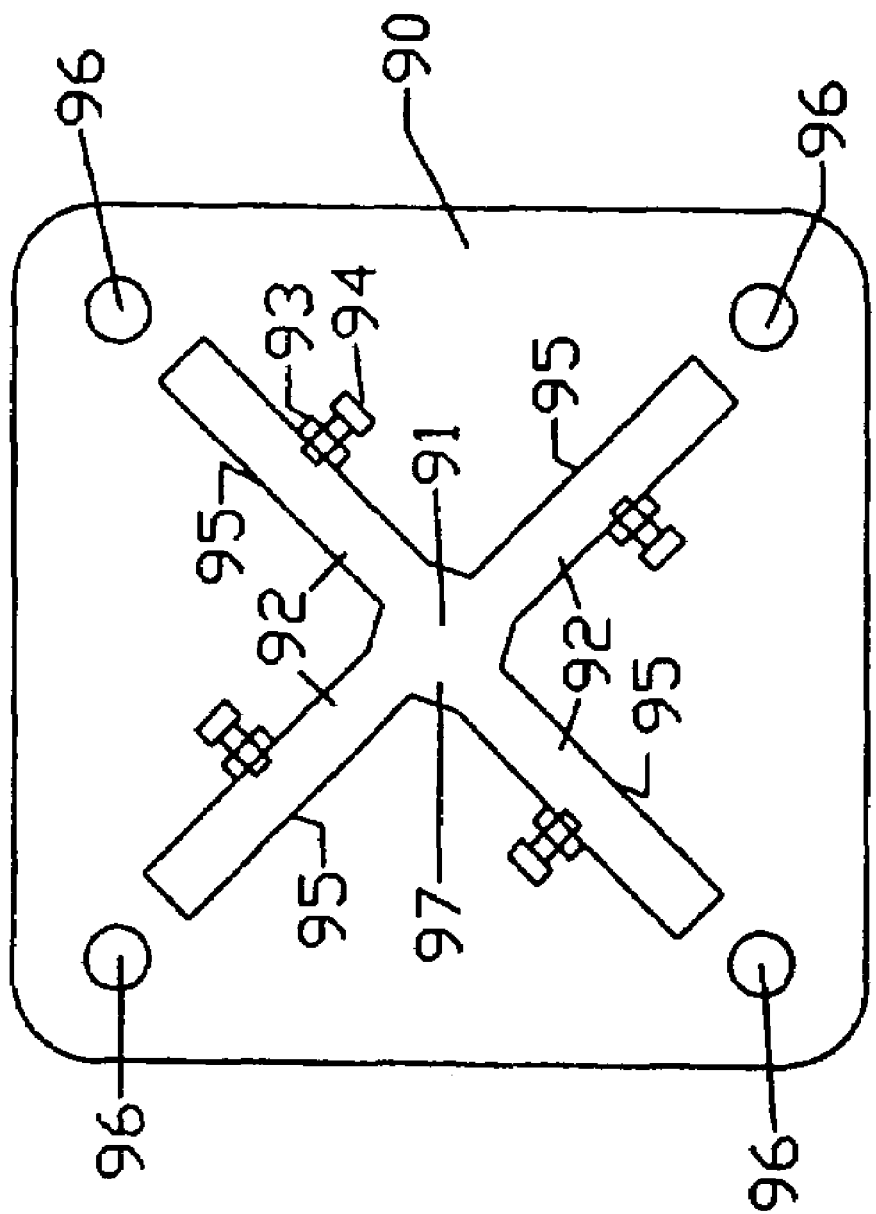
FIG. 9 illustrates a further squaring jig for the construction of an X-rotor.

In order to assist in the assembling of X-rotors 32, various types of jigs may be used such as those shown in FIGS. 7a and 9. FIG. 7a illustrates the jig 70 by itself whereas FIG. 7b illustrates the positioning of one end of an X-rotor 32 made from plates 51, 54 into a squaring jig 70. Jig 70 includes an X-opening 71 with branches 72 extending radially from the center. The branches 72 are symmetrically spaced at angles of 90°, their length is in the order of W/2 and the width of the branches 72 is slightly greater than the thickness t of the plates used in the X-rotor 32. The opening 71 is notched 77 at its center to accommodate the welds 78 that fix the plates 54 to plate 51. Jig 70 further includes holes 73 located at the ends of the branches 72, which line-up with the centers of the flail tabs 36 along the length of the plates 51, 54 to position them on the edges of the plates 51, 54.

Figure 8A:
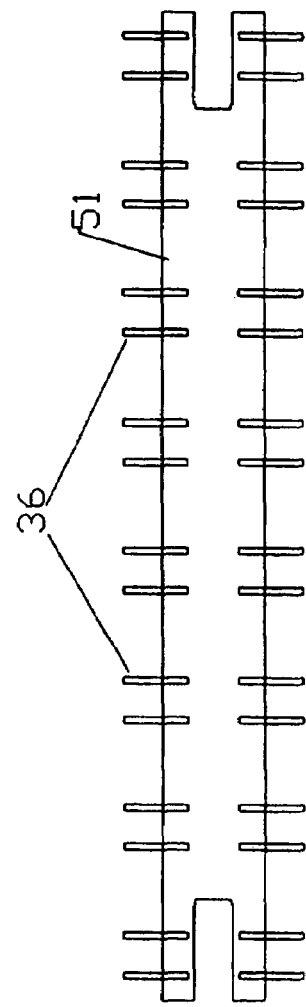
FIGS. 8a and 8b illustrate the positioning of the flail supports on the X-rotor plates.
Figure 8B:
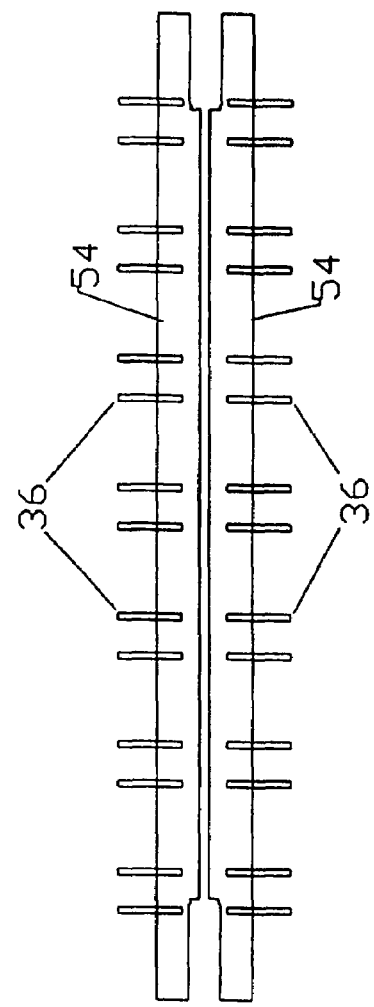

The supports or tabs 36 may then be appropriately spaced along the edges 38 of the plates 51 and 54 and welded into place. An example of the relative positioning of the flail supports or tabs 36 is shown on FIGS. 8a and 8b. FIG. 8a shows 8 pairs of tabs 36 on each edge equally spaced along the length of the plate 51, for example. Further 7 pairs of tabs 36 are equally spaced on the edge of each of the two plates 54. However, as shown on FIG. 8b, the tabs 36 on plates 54 are offset from those on plate 51 such that they fall in between the tabs 36 on plate 51.

A further jig 90 is illustrated in FIG. 9. This particular jig 90 is designed for the assembly of X-rotors having different widths w and different plate thicknesses T. The width of the branches 92 of the opening 91 in jig 90 is substantially greater then the expected thickness t of the plates 51 and 54 or 61. In order to hold the plates 51 and 54 or 61 in place, a squaring setscrew 94 is threaded into a flange 93 that is fixed to the jig 90. Once the plates 51 and 54 or 61 are placed in the opening 91, the setscrew 94 is tightened such that the plates 51 and 54 or 61 are pressed up against the face 95 of the slot 91. In this way, the plates 51 and 54 or 61 can be positioned and held in place for welding. Jig 90 is further notched 97 at its center to accommodate the plate welds, and includes holes 96 located at the ends of the branches 92, which can be used to position the flail tabs or supports 36 as described above.

Though the manufacturing and the assembling of the flail disintegrator 30 may be done in many ways depending on the form of the components used. The following process which used the above described squaring jig as well as a rotor jig having a bed rest and center axis jaws, has been found to be advantageous. It will be described in conjunction with FIG. 7b. The process steps include:

match rotor side plates 54 to a rotor base plate 51;
  slide a squaring jig 70 over the ends of the plates to ensure squareness of the plates 51, 54;
  position flail tabs 36 on outer edges of the plates 51, 54 using the holes 73 in the jig 70;
  measure the flail tab 36 positions along the plates 51, 54 and tack the flail tabs to the plates;
  stitch weld the side rotor plates 54 to the base plate 51;
  complete the welding of the flail tabs 36;
  allow the rotor assembly to cool to room temperature to allow all expansion and contraction to stop;
  position the rotor 32 in a rotor jig to center the axis 40 of the rotor 32;
  adjust the rotor jig bed rest to suspend the rotor 32;
  detach the center axis jaws;
  attach the rotor shafts 42, 43 (FIG. 4) into the center axis jaws to position the shafts 42, 43 into the shaft mounting slots 52, 55 and 53, 56 (FIGS. 5a and 5b);
  weld the rotor shafts 42, 43 to the plates 51, 54;
  detach the center axis jaws;
  slide one twine disk 48 over each rotor shaft 42, 43, butt up to the plates 51, 54 and weld;
  lift rotor 32 off of the bed rest;
  move the rotor 32 to a rotor balancer and install the flails 33a, 33b (FIG. 3);
  spin the rotor to check its balance and add balancing weights as required;
  paint the completed flail disintegrator 30.

Figure 10A:
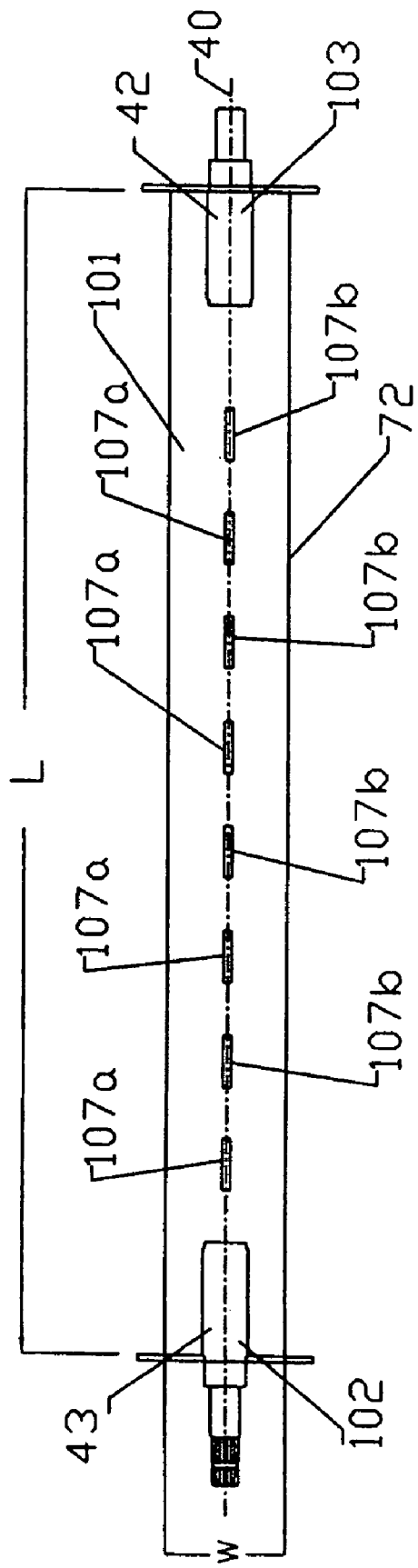
FIGS. 10a, 10b and 10c illustrate another embodiment of rotor plates used in the construction of an X-rotor in accordance with the present invention.
Figure 10B:
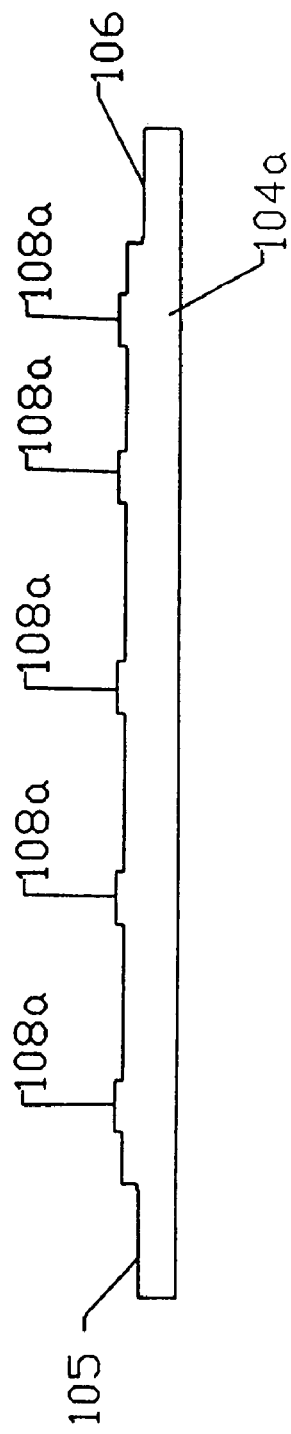
Figure 10C:
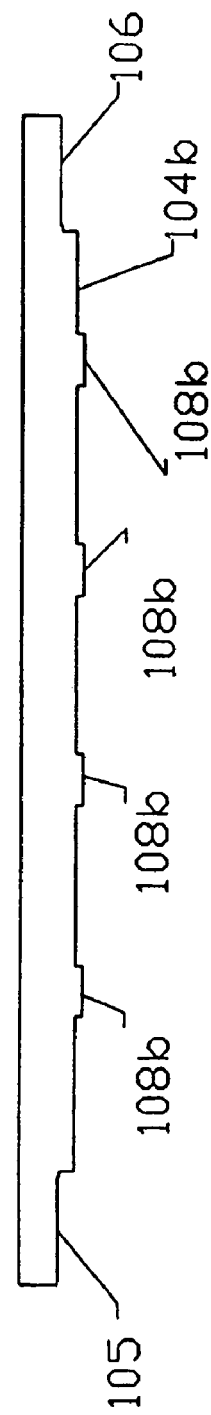

FIGS. 10a to 10c illustrate a further arrangement of three plates that can be used to make up the X-rotor 32. In a similar manner to the arrangement described with reference to FIGS.

5a and 5b, the X-rotor 32 would include one full width plate 101 of the type shown in FIG. 10a and two half width plates 104a and 104b of the type shown in FIGS. 10b and 10c. Plate 101 has a thickness T, a length L equal to the desired length of the X-rotor 32 and a width W equal to the overall width of the desired X-rotor 32. Plate 101 further includes notches 102 and 103 at either end for receiving the rotor shafts 42 and 43 described with regard to FIG. 4. Plates 104a and 104b have a thickness T, a length L equal to the desired length of the X-rotor 32 and width that is slightly less than W/2 in order to compensate for the thickness of the plate 101. Thus, if the thickness T of plate 101 is ½ inch, then the width of plates 104a and 104b would be (W/2−¼) inches such that when plate 104a and 104b are placed on either side of plate 101 and perpendicular to it, the overall width of the desired X-rotor 32 will be W. Plates 104a and 104b also have notches 105, 106 at the ends of the plates 104a and 104b for the rotor shafts 42 and 43.

Further in order to align the plates 101, 104a and 104b in assembly and to provide a stronger product, plate 101 includes a number of dowel slots 107a and 107b alternately spaced along its centerline axis 40. Plate 104a has a number of dowels 108a on its inner edge, these dowels 108a match-up with the dowel slots 107a in plate 101. Further plate 104b also has a number of dowels 108b on its inner edge, these dowels 108b match-up with the remaining dowel slots 107b in plate 101. The plates 104a and 104b are positioned on either side of plate 101 with the dowels 108a and 108b positioned within the dowel slots 107a and 107b respectively and then the plates 101, 104a and 104b are permanently welded into place.

FIGS. 11a to 11c illustrate a further arrangement of three plates that can be used to make up the X-rotor 32. In a similar manner to the arrangement described with reference to FIGS. 10a to 10c, the X-rotor 32 would include one full width plate 111 of the type shown in FIG. 11a and two half width plates 114a and 114b of the type shown in FIGS. 11b and 11c. Plate 111 has a thickness T, a length L equal to the desired length of the X-rotor 32 and a width W equal to the overall width of the desired X-rotor 32. Plate 111 further includes notches 112 and 113 at either end for receiving the rotor shafts 42 and 43 described in conjunction with FIG. 4. Plates 114a and 114b have a thickness T, a length L equal to the desired length of the X-rotor 32 and width that is slightly less than W/2 in order to compensate for the thickness T of the plate 111. Thus, if plate 111 is ½ inch thick, then the width of plates 114a and 114b would be (W/2−¼) inches such that when plate 114a and 114b are placed on either side of plate 111 and perpendicular to it, the overall width of the desired X-rotor 32 will be W. Plates 114a and 114b also have notches 115, 116 at each end of the plates for the rotor shafts 42 and 43.

Further in order to align the plates 111, 114a and 114b in assembly and to provide a stronger product, plate 111 includes a number of dowel slots 117a, and 117b that are alternately spaced along its centerline axis 40 and one further dowel slot 117c at each end of plate 111. Plate 114a has a number of dowels 118a on its inner edge, these dowels 118a match-up with the dowel slots 117a in plate 111. Plate 114a also includes a further dowel 118c at each end of the plate 114a. Further plate 114b also has a number of dowels 118b on its inner edge, these dowels 118b match-up with the remaining dowel slots 117b in plate 111. Plate 114b also includes a further dowel 118d at each end of the plate 114b. Both dowel slots 117c can accommodate a dowel 118c and a dowel 118d from each of the plates 114a and 114b. Once the plates 114a and 114b are positioned on either side of plate 111, and the dowels are positioned within the dowel slots, the plates are permanently welded into place.

Figure 12B:
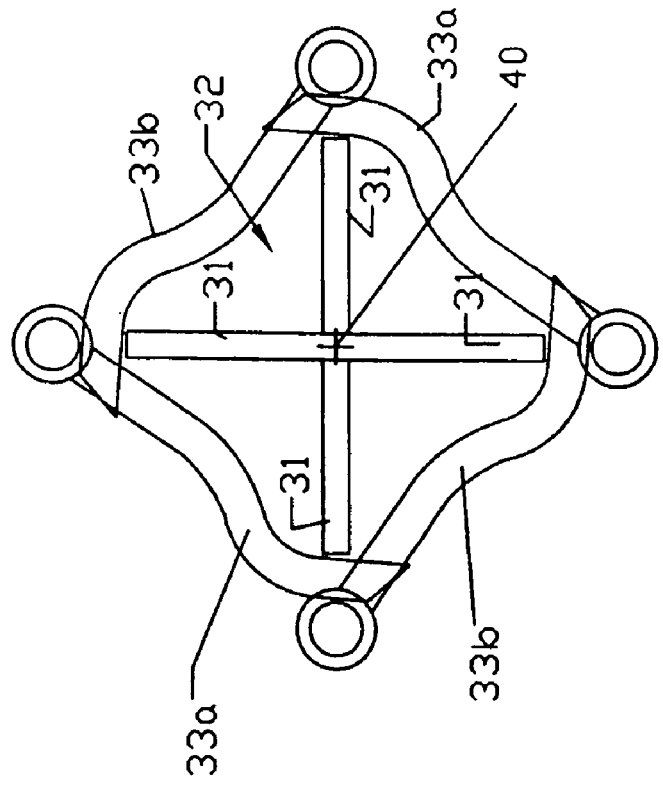
FIGS. 12a and 12b illustrate the extreme positions of the flails on a small X-rotor in accordance with the present invention.
Figure 12A:
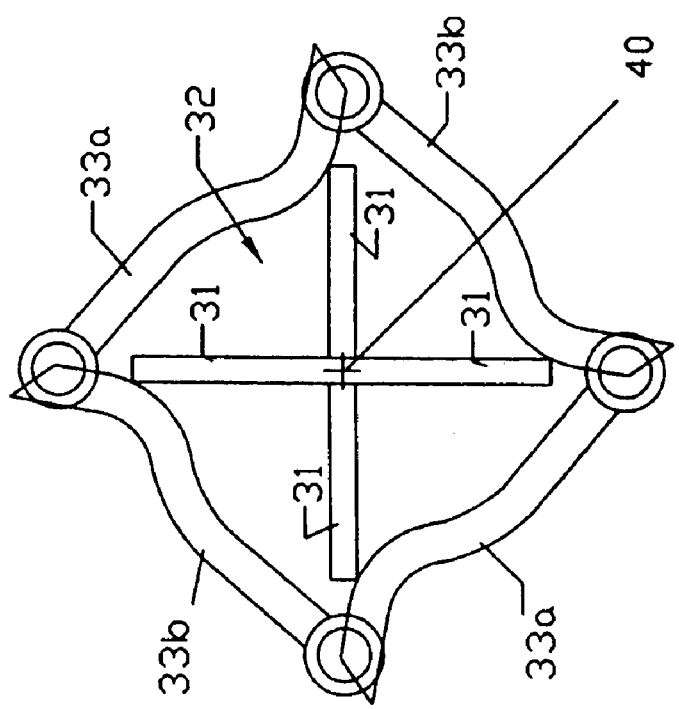

The overall width of a disintegrator 30 with its flails 33a, 33b extended is limited by the space restrictions found within a bale processor. This is particularly the situation when an existing bale processor is being retrofitted with a new disintegrator 30. Since the maximum overall width of a disintegrator 30 is fixed, a user can opt to have a smaller X-rotor 32 width W with longer flails 33a, 33b or a larger X-rotor 32 width W with shorter flails 33a, 33b. Longer flails 33a, 33b on a smaller X-rotor 32 have more inertia and therefore cut through the bale with greater force. FIGS. 12a and 12b schematically illustrate the position of the flails 33a, 33b in their slap back position and their forward position respectively. In this embodiment, the flails 33a, 33b are longer than the distance or spacing between the outer edges of adjacent rotor plates 31, with the result that the flails 33a, 33b always hit on the edge of the rotor plates 31; over time this can cause some deformation on the edge of the rotor plate 31 as well as the flails 33a, 33b.

Figure 13B:
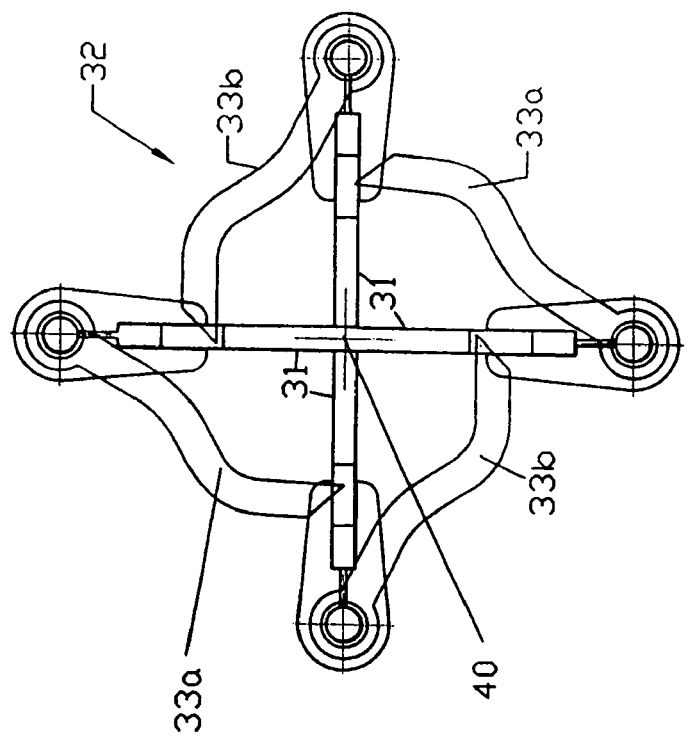
FIGS. 13a and 13b illustrate the extreme positions of the flails on a large X-rotor in accordance with the present invention.
Figure 13A:
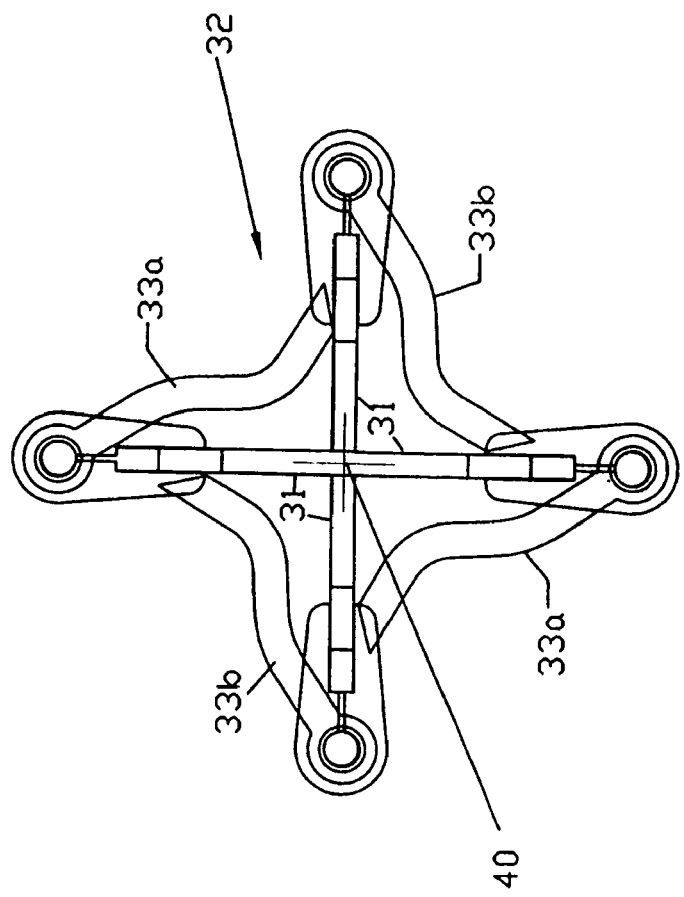

To overcome this situation and yet maintain a disintegrator 30 having a similar overall width, the width W of the X-rotor 32 may be increased as the length of the flails 33a, 33b is decreased. The flails 33a 33b in the resulting disintegrator 30 will strike the sides of the rotor plates 31 rather then the ends as shown schematically in FIGS. 13a and 13b where the length of the flails is shorter than the distance or spacing between the outer edges of adjacent rotor plates 31. This will prevent the deformation of the edges of the rotor plates 31.

Figure 14A:
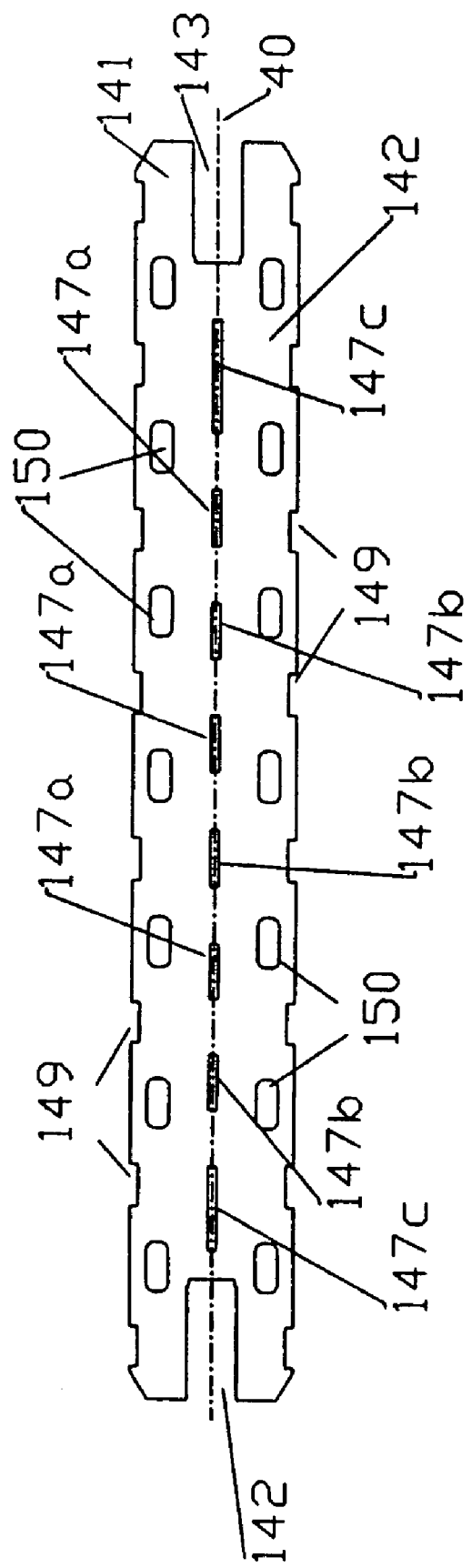
FIGS. 14a, 14b, and 14c illustrate another embodiment of rotor plates used in the construction of an X-rotor in accordance with the present invention.
Figure 14C:
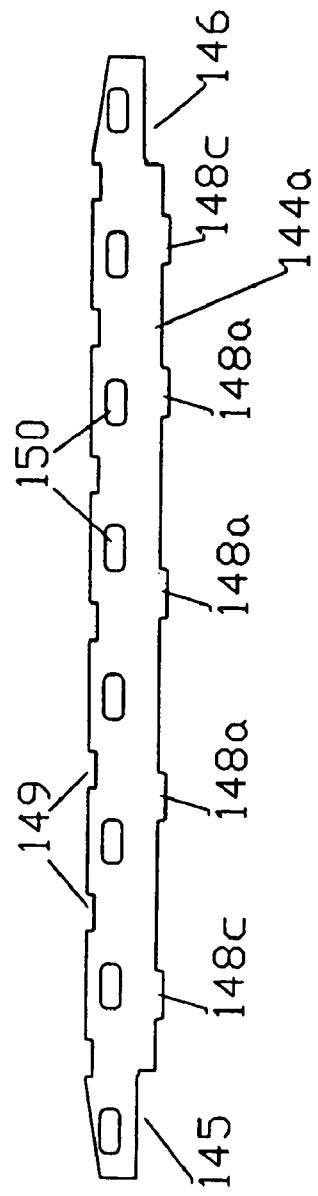
Figure 14B:
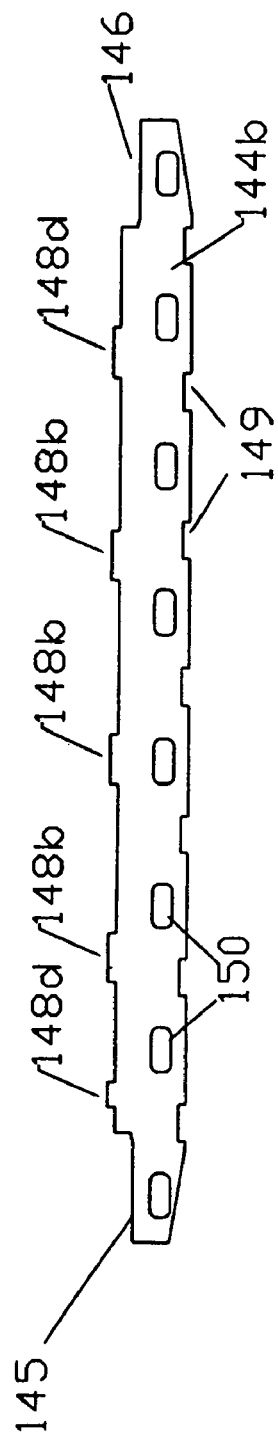
Figure 16:
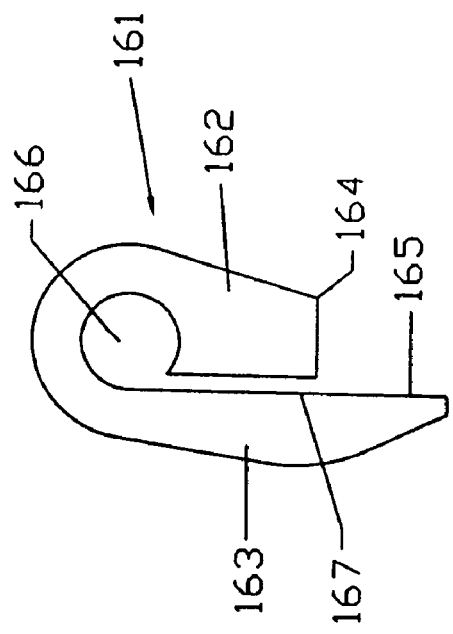
FIG. 16 illustrates another embodiment of a unidirectional flail support.
Figure 15:
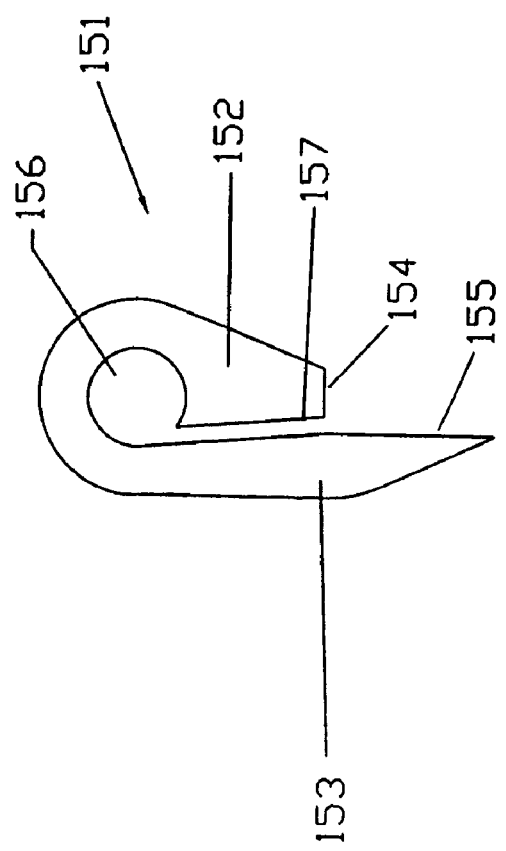
FIG. 15 illustrates one embodiment of a unidirectional flail support.

FIGS. 14a to 14c illustrate a further arrangement of three plates that can be used to make up the larger width W of X-rotor 32. In a similar manner to the arrangement described with reference to FIGS. 11a to 11c, the X-rotor 32 would include one full width plate 141 of the type shown in FIG. 11a and two half width plates 144a and 144b of the type shown in FIGS. 14b and 14c. Plate 141 has a thickness t, a length L equal to the desired length of the X-rotor 32 and a width W equal to the overall width of the desired X-rotor 32. Plate 141 further includes notches 142 and 143 at either end for receiving the rotor shafts 42 and 43 described in conjunction with FIG. 4. Plates 144a and 144b have a thickness T, a length L equal to the desired length of the X-rotor 32 and width that is slightly less than W/2 in order to compensate for the thickness of the plate 141. Thus, if thickness t of plate 141 is ½ inch, then the width of plates 144a and 144b would be (W/2−¼) inches such that when plate 144a and 144b are placed on either side of plate 141 and perpendicular to it, the overall width of the desired X-rotor 32 will be W. Plates 144a and 144b also have notches 145, 146 at each end of the plates for the rotor shafts 42 and 43.

Further in order to align the plates 141, 144a and 144b in assembly and to provide a stronger product, plate 141 includes a number of dowel slots 147a and 147b that are alternately spaced along its centerline axis 40 and one further dowel slot 147c at each end of plate 141. Plate 144a has a number of dowels 148a on its inner edge, these dowels 148a match-up with the dowel slots 147a in plate 141. Plate 144a also includes a further dowel 148c at each end of the plate 144a. Further plate 144b also has a number of dowels 148b on its inner edge, these dowels 148b match-up with the remaining dowel slots 147b in plate 141. Plate 114b also includes a further dowel 148d at each end of the plate 144b. Both dowel slots 147c can accommodate a dowel 148c and a dowel 148d from each of the plates 144a and 144b. Once the plates 144a and 144b are positioned on either side of plate 141, and the dowels are positioned within the dowel slots, the plates are permanently welded into place. In addition, rotor plates 141, 144a and 144b include indentations or cutouts 149 on the outer edges of the rotor plates 141, 144a and 144b. These indentations 147 are slightly wider than the width of the flails 33a, 33b and are located such that a pair of flail supports 36 will be positioned over each indentation 147. In this way, the flail 33a, 33b mounted in the support 36 will be provided for extra clearance allowing the flail 33a, 33b to swing through a greater angle. Further, rotor plates 141, 144a and 144b are provided with relief holes 150, these holes 150 will receive the ends of the flails 33a, 33b when they are forced to their extreme forward position and preventing the tips of the flails 33a, 33b from wedging themselves into the rotor plates 141, 144a and 144b. Also as illustrated in FIGS. 14a to 14c, the ends of the rotor plates 141, 144a and 144b are tapered. This shape permits the X-rotor 32 to be more easily fitted into conventional bale processors.

FIGS. 15 to 18 illustrate various types of supports or tabs 151, 161, 171 and 181 respectively, which may be used to mount the flails 33a, 33b to the X-rotor plates 31 for the X-rotor 32. All of the supports or tabs 151, 161, 171 and 181 are characterized by having two legs 152, 153; 162, 163, 172, 173; and 182, 183 respectively. Supports 151 and 161, which are designed as uni-directional supports for rotation in only one direction, are asymmetrical in that their legs 152, 153 and 162, 163 respectively are of unequal length and width. These supports 151, 161 sit on the edge of the rotor plate such that the end 154, 164 of the shorter leg 152, 162 is welded to the edge of the rotor plate 31 and the inside edge 155, 165 of the longer leg 153, 154 is welded to the front to the rotor plate 31; the front of the rotor plate 31 being the side that faces the direction of rotation of the disintegrator 30. The supports 151, 161 may be stamped out as a solid component or they may be manufactured by laser cutting. In the latter case, it is preferred to cut out the component from start to finish in one cycle starting at a non-critical point in order to have smooth cuts at critical points such as the welding surfaces 154, 155 and the opening 156, 166, which will receive the pivot for the flail 33a, 33b. The purpose of slot 157, 167 is to allow the support 151, 161 to be cut by laser in a single continuous operation.

Supports 171 and 181 are designed as bi-directional supports for rotation in either direction. Supports 171 and 181 are symmetrical in that their legs 172, 173 and 182, 183 respectively are of equal length with the space 174, 184 between the legs being of sufficient width to snugly straddle the edge of the rotor plate 31. The inside edges 175, 185 of legs 172, 173; 182, 183 are welded to the sides of the rotor plate 31.

Figure 18:
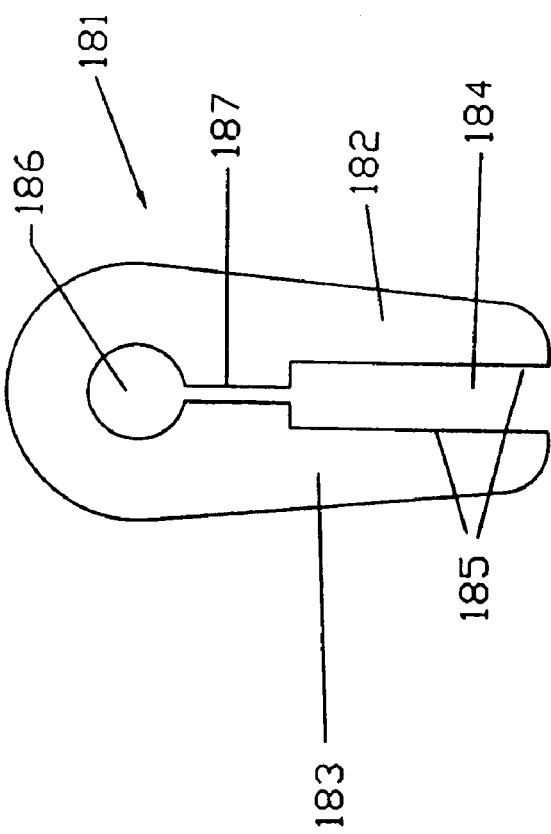
FIG. 18 illustrates another embodiment of a bi-directional flail support.
Figure 17:
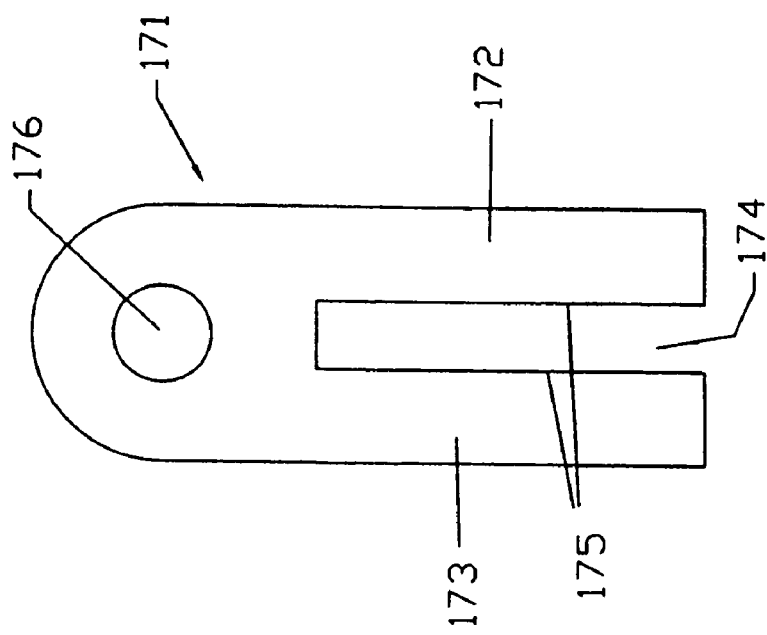
FIG. 17 illustrates one embodiment of a bi-directional flail support.

Support 171 is bi-directional symmetrical, however the opening 176 to receive the pivot for the flail must be pierced, and if done with a laser, usually is found to have some metallic residue or slag that has to be removed. Support 181 in FIG. 18 is also bi-directional symmetrical. However, in additional, it can be efficiently cut by laser whereby the laser commences the cut at a non-critical point such as in the slot region 187, moves through the opening 186 which receives the for pivot the flail 33a, 33b, returns through the slot region 187 through to the surface 185 that is to be welded to the X-rotor plate 31, then around the outside periphery of the support 181 back to the welding surface 185 and back into the slot 187. The slot region 187 is not critical in that metallic residue or slag in this region has no adverse effects.

Once the supports 171 or 181 are welded to the X-rotor plates 31 of the X-rotor 32, the direction of rotation of the disintegrator 30 will be determined by the type of flails 33a, 33b that are mounted to the supports 171, 181 and how the flails 33a, 33b are mounted if they are unidirectional. Since the supports 171 and 181 are bi-directional, the X-rotor disintegrator 30 on which they are welded can be used for a right hand or left hand discharge processor depending on the direction in which uni-directional flails 33a, 33b are mounted.

The disintegrator in accordance with the present invention is particularly advantageous in a number of ways. For instance, the X-rotor can be manufactured in a controlled manner assuring a symmetrical and well balanced disintegrator. The X-rotor is built in an open fashion with laser-cut flat bars. Using flat-bars in an X shape provides a more controlled welding environment; all of the welds are out in the open, which improves the quality of the rotor. The flat plates can be manipulated and squared when necessary. Since the flat plates can be stacked flat during transportation, damage and bending is much less likely to happen. The extra control during the manufacturing process assures symmetry and eases the balancing procedure. Improved balancing allows the rotor to be run at a higher speed. Since the rotor plates are laser-cut, the manufacturing aids, such as the aligning dowels and slots are possible.

Current rotors use steel pipe with ⅜ inch wall thickness. Even using ½ inch steel plate for the X-rotors gives the X-rotor more resistance to fatigue without much change in the over-all weight of the rotor. The rotors may also be made from other types of materials such as different metals.

The relief holes 150 illustrated in FIGS. 14a to 14c extend the life of both the rotor and the flail by relieving fatigue stress. Since the flail has more rotation angle before it hits the rotor, the flail loses more of its inertia before it hits. As such, the flail hits the rotor with less force and causes less damage to itself and to the rotor.

The shape of the X-rotor gives it four large valleys between the rotor plates as seen in FIG. 2. This gives the operator excellent access to cut the twine that has wrapped itself around the rotor. The large open area allows a large knife or other twine removal system such as an electric twine cutter to be used to remove the twine.

The X-rotor itself acts as a large fan and assists the flails to increase airspeed in the bale processing chamber. This increased airspeed translates into increased discharge distance for fine as well as coarse materials. It has been shown that the average windspeed of the X-rotor may be approximately 20% higher than that equivalent size conventional round rotors, resulting in an increase in discharge distance with no noticeable increase in the horsepower required. The increased airspeed also improves the cleaning out of the bale processing chamber and reduces the amount of material that is reprocessed, thus increasing the efficiency of the bale processor.

In addition, the supports for the flails can be produced more economically and provide greater strength when welded to the x-rotor plates.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A rotor for a bale processor disintegrator comprising:
a rotor axis;
a plurality of rotor plate sections, each of the rotor plate sections having a first end located adjacent one end of the rotor axis, a second end located adjacent an opposite end of the rotor axis and an outer edge displaced from the rotor axis, each of the rotor plate sections extending radially from the rotor axis and being attached longitudinally substantially along an entire length of the rotor axis; and bale disintegrators mounted on the outer edge of the rotor plate sections for bale disintegration during rotor rotation about the rotor axis.

2. A rotor for a bale processor disintegrator as in claim 1 having at least four rotor plate sections.

3. A rotor for a bale processor disintegrator as in claim 2 having four rotor plate sections.

4. A rotor for a bale processor disintegrator as in claim 1 wherein the bale disintegrators comprise:

a plurality of pairs of flail supports fixed to the outer edge of the rotor plate sections; and a flail pivotally mounted to each of the flail support pairs.

5. A rotor for a bale processor disintegrator as in claim 4 wherein the pairs of flail supports on adjacent rotor plate sections are offset from one another.

6. A rotor for a bale processor disintegrator as in claim 4 wherein the flail supports are unidirectional.

7. A rotor for a bale processor disintegrator as in claim 6 wherein each unidirectional flail support includes a first leg for welding to the outer edge of the rotor plate section and a second leg for welding to a side of the rotor plate section.

8. A rotor for a bale processor disintegrator as in claim 4 wherein the flail supports are bi-directional.

9. A rotor for a bale processor disintegrator as in claim 8 wherein each bi-directional flail supports has a pair of spaced legs for positioning the support over the outer edge of the rotor plate section for welding to the sides of the rotor plate section.

10. A rotor for a bale processor disintegrator as in 4 wherein the flails are unidirectional.

11. A rotor for a bale processor disintegrator as in claim 4 wherein the flails are bi-directional.

12. A rotor for a bale processor disintegrator as in claim 4 wherein the flails are longer than the distance between the outer edges of adjacent rotor plate sections.

13. A rotor for a bale processor disintegrator as in claim 4 wherein the flails are shorter than the distance between the outer edges of adjacent rotor plate sections.

14. A rotor for a bale processor disintegrator as in claim 13, wherein the rotor plate sections further comprise a plurality of indentations or cutouts, sized and spaced to receive an end of each flail attached to an adjacent rotor plate section.

15. A rotor for a bale processor disintegrator as in claim 1, comprising:

a first rotor plate having a predetermined width W, length L and thickness T;

second and third rotor plates each having a thickness T, a length L and a width approximately equal to (W/2−T/2), the second rotor plate being fixed to one side of the first rotor plate and the third rotor plate being fixed to the other side of the first rotor plate to form a symmetrical rotor having a length L and an X cross-section, the intersection of the rotor plates forming the rotor axis with each rotor plate section extending radially from the rotor axis.

16. A rotor as claimed in claim 15 wherein dowel slots are spaced along the centerline of the first rotor plate, and wherein dowels corresponding to the dowel slots are located on the inner edges the second and third rotor plates.

17. A rotor for a bale processor disintegrator as in claim 4, wherein the rotor plate sections further comprise an outer edge having a plurality of indentations or cutouts sized and spaced for providing extra clearance to allow the flails to swing through a greater angle.

18. A rotor for a bale processor disintegrator as in claim 1, further comprising a shaft extending beyond the first and second ends of the rotor plate sections along the rotor axis, whereby the rotor is adapted to be rotably mounted in a bale processor.

19. A rotor for a bale processor disintegrator as in claim 18, wherein twine disks are mounted on the shaft.

20. A rotor for a bale processor disintegrator comprising:

a rotor axis;

a plurality of rotor plate sections having first and second ends and an outer edge displaced from the rotor axis, the rotor plate sections extending radially from the rotor axis and being attached thereto; wherein the first and the second rotor plate has a predetermined width W, length L and thickness T, and each rotor plate has a slot with a width T, and a length L/2 along the centerline from one end of the plate, wherein the first and second rotor plates are mated together along by the slots to form said rotor having said length L and an X cross-section, the intersection of the rotor plates forming the rotor axis with each rotor plate section extending radially from the rotor axis; and bale disintegrators mounted on the outer edge of the rotor plate sections for bale disintegration during rotor rotation.

\* \* \* \* \*

UNITED STATES PATENT AND TRADEMARK OFFICE
CERTIFICATE OF CORRECTION

PATENT NO. : 7,581,691 B2  Page 1 of 1
APPLICATION NO. : 10/874728
DATED : September 1, 2009
INVENTOR(S) : Helmeczi et al.

It is certified that error appears in the above-identified patent and that said Letters Patent is hereby corrected as shown below:

Col. No. 11, Line 31 "as in 4" should read --as in Claim 4--;

Col. No. 12, Line 10 "edges the second" should read --edges of the second--.

Signed and Sealed this

Sixteenth Day of March, 2010

David J. Kappos
*Director of the United States Patent and Trademark Office*